(12) United States Patent
Zhou

(10) Patent No.: US 12,118,748 B2
(45) Date of Patent: Oct. 15, 2024

(54) UNIFIED CALIBRATION BETWEEN DVS AND CAMERA

(71) Applicant: Harman International Industries, Incorporated, Stamford, CT (US)

(72) Inventor: Rengao Zhou, Shanghai (CN)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 44 days.

(21) Appl. No.: 18/248,361

(22) PCT Filed: Oct. 30, 2020

(86) PCT No.: PCT/CN2020/125262
§ 371 (c)(1),
(2) Date: Apr. 7, 2023

(87) PCT Pub. No.: WO2022/088039
PCT Pub. Date: May 5, 2022

(65) Prior Publication Data
US 2023/0386082 A1  Nov. 30, 2023

(51) Int. Cl.
*G06T 7/80*  (2017.01)
(52) U.S. Cl.
CPC ...... *G06T 7/80* (2017.01); *G06T 2207/30208* (2013.01)
(58) Field of Classification Search
CPC ... G06T 7/80; G06T 2207/30208; G06T 7/85; G06T 2207/10016; H04N 13/246; H04N 17/002
See application file for complete search history.

(56) References Cited

U.S. PATENT DOCUMENTS

| 9,489,735 | B1* | 11/2016 | Reitmayr | G06T 7/80 |
| 2018/0098082 | A1* | 4/2018 | Burns | H04N 19/117 |
| 2018/0160110 | A1* | 6/2018 | Koesters | H04N 25/707 |

FOREIGN PATENT DOCUMENTS

| CN | 107255443 A | 10/2017 |
| CN | 109215063 A | 1/2019 |
| CN | 109827502 A | 5/2019 |
| CN | 110689572 A | 1/2020 |
| WO | 2017048382 A1 | 3/2017 |

OTHER PUBLICATIONS

ISA National Intellectual Property Administration of the People's Republic of China, International Search Report Issued in Application No. PCT/CN2020/125262, Jul. 21, 2021, WIPO, 2 pages.
European Patent Office, Extended European Search Report Issued in Application No. 20959201.3, Jun. 19, 2024, Germany, 11 pages.

* cited by examiner

*Primary Examiner* — Kyu Chae
(74) *Attorney, Agent, or Firm* — McCoy Russell LLP

(57) ABSTRACT

A unified calibration method between a DVS and a camera, in which a special calibration board is set up which consists of a calibration grid pattern and LEDs attached to the corners of the calibration grids. The camera finds the corners of calibration grid by capturing the image, and the DVS finds the same corners by detecting the intensity changes of the LEDs at the corners, to establish a unified world coordinate system as a reference coordinate system. After performing the calibration and coordinate system transformations, an extrinsic matrix between the DVS and the camera can be obtained.

20 Claims, 12 Drawing Sheets

UNIFIED CALIBRATION BETWEEN DVS AND CAMERA

CROSS REFERENCE TO RELATED APPLICATIONS

The present application is a U.S. National Phase of International Application No. PCT/CN2020/125262, entitled "UNIFIED CALIBRATION BETWEEN DVS AND CAMERA", and filed on Oct. 30, 2020. The entire contents of the above-listed application are hereby incorporated by reference for all purposes.

TECHNICAL FIELD

The inventive subject matter relates generally to unified calibration technology. More particularly, the inventive subject matter relates to a method of realizing the unified calibration between a Dynamic Vision Sensor (DVS) and a camera and a system thereof.

BACKGROUND

In image measurement or machine vision applications, the calibration of the vision sensor is a very critical change. The accuracy of the calibration result and the stability of the calibration algorithm directly affect the accuracy of the result produced by the vision sensor. The conventional camera usually has various applications. The purpose of camera calibration is to find the camera's intrinsic and extrinsic parameters, to obtain the projection matrix of the three-dimensional scene and the two-dimensional image, to establish the imaging geometric model, and to correct the distortion of the lens to generate the images. In a multi-camera system, unified calibration technology is usually utilized to figure out the extrinsic matrix between its cameras.

The DVS (Dynamic Vision Sensor) only captures intensity changes and then creates asynchronous pixels. There may be a need to bind the DVS to the conventional camera for performing applications in an integrated manner. Therefore, the unified calibration between the DVS and the camera is needed when binding.

The unified calibration between the DVS and the camera finds the spatial conversion relationship between them, and finds the extrinsic matrix required for the conversion between different coordinate systems, in order to realize the subsequent fusion of DVS and camera data. After binding, any applications that are conducted by the camera may also be possible for the DVS.

However, because of the different characteristics between the DVS and the conventional camera, current hardware set-up and software algorithms are not applicable for the DVS.

The inventive subject matter proposes a solution for the unified calibration between the DVS and the camera.

SUMMARY

The method of realizing the unified calibration between the at least one DVS and the at least one camera comprises the steps of binding the at least one DVS to the at least one camera; setting up a calibration board comprising calibration grids and a plurality of high-frequency LEDs (Light-Emitting Diodes), wherein the calibration grids are arranged on a surface of the calibration board, and the plurality of high-frequency LEDs are each attached to corners of the calibration grids; arranging the calibration board inside the fields of view of both the at least one DVS and the at least one camera, and the surface with the calibration grids facing to the at least one DVS and the at least one camera; and enabling the at least one DVS and the at least one camera to detect the corners of the calibration grids on the calibration board, respectively. The method further comprises the steps of capturing the intensity changes to generate event data by the at least one DVS, integrating the pixels created from the event data into multiple consecutive frames of the DVS calibration board image, determining continuous pixels from the multiple consecutive frames, detecting the locations of the plurality of high-frequency LEDs, and calculating extrinsic matrix between the at least one DVS and the at least one camera.

The system of realizing the unified calibration between the at least one DVS and the at least one camera comprises the at least one DVS bound to the at least one camera, and the calibration board comprising calibration grids and a plurality of high-frequency LEDs. The calibration grids are arranged on a surface of the calibration board, and the plurality of high-frequency LEDs are each attached to the corners of the calibration grids. The calibration board is arranged inside the fields of view of both the at least one DVS and the at least one camera, and the surface with the calibration grids is facing to the at least one DVS and the at least one camera. The at least one DVS and the at least one camera are enabled to detect the corners of the calibration grids on the calibration board. The at least one DVS further captures the intensity changes on the calibration board to generate the event data. The system further comprises a processing unit coupled to the at least one DVS and the at least one camera. The processing unit is configured to integrate the pixels created from the event data into multiple consecutive frames of the DVS calibration board image, determine continuous pixels from the multiple consecutive frames, detect the locations of the plurality of high-frequency LEDs, and calculate the extrinsic matrix between the at least one DVS and the at least one camera, Alternatively, blobs detected from continuous-pixel image integrated by the continuous pixels are corresponding to the locations of the plurality of high-frequency LEDs.

Alternatively, the continuous pixels are those pixels continuously appear among the multiple consecutive frames.

Alternatively, the multiple consecutive frames are at least two consecutive frames.

Alternatively, the plurality of high-frequency LEDs each has at least two different intensities detectable by the at least one DVS.

Alternatively, each grid of the calibration grids is a square, and light spots generated with the at least two different intensities do not disturb depictions of the square in calibration board images captured by the at least one camera.

Alternatively, the calibration grids are composed of black squares and white squares at intervals.

Alternatively, the locations of the plurality of high-frequency LEDs detected are matched one by one to the corners of the calibration grids detected in the camera calibration board image captured by the at least one camera.

Alternatively, the calibration board can be moved so that the at least one DVS and the at least one camera further detect the corners on the calibration board at different positions, different angles, and different attitudes, respectively.

Alternatively, the extrinsic matrix between the at least one DVS and the at least one camera is calculated by performing coordinate system transformations.

BRIEF DESCRIPTION OF THE DRAWINGS

The inventive subject matter may be better understood from reading the following description of non-limiting embodiments, with reference to the attached drawings. In the FIGs, like reference numeral designates corresponding parts, wherein below.

DETAILED DESCRIPTION

The detailed description of one or more embodiments of the inventive subject matter is disclosed hereinafter; however, it is understood that the disclosed embodiments are merely exemplary of the inventive subject matter that may be embodied in various and alternative forms. The FIGs are not necessarily to scale; some features may be exaggerated or minimized to show details of particular components. Therefore, specific structural and function details disclosed herein are not to be interpreted as limiting, but merely as a representative basis for teaching one skilled in the art to variously employ the inventive subject matter.

The objective of the calibration generally is to obtain the intrinsic and the extrinsic matrices, which are determined using the images from the scene and its correspondences in the camera projections with a calibration grid. In a way of example, a chessboard pattern may be used as the calibration grid.

The camera calibration method usually is to find corners of the chessboard pattern on the calibration board. However, unlike the conventional camera, the DVS does not generate images. The DVS transmits pixel-level events representative of intensity changes. Since the DVS only captures the intensity changes, if there is no intensity change, then there would be no event data. Thus, the DVS would not generate a complete depiction image of the chessboard pattern, and the set-up for calibrating the conventional camera cannot be directly applied in the DVS calibration. Therefore, an intensity change is manually introduced to locate the corners. In a way of example, high frequency LED arrays can be used to function as the corners in the chessboard pattern, the DVS can find these corners by capturing the intensity changes of the flashing LEDs, and thus it would be possible for the DVS to use the similar algorithms as calibrating stereo-cameras. In a way of example, in a stereo camera comprising two cameras, when the unified calibration is performing between its two cameras, the same calibration grids are used to establish a unified world coordinate system by the two cameras, and the external matrices for converting this unified world coordinate system to the camera coordinate system of each of the two cameras can be obtained, separately. Then, the external matrix between the two cameras can be obtained through performing the coordinate transformations by using the unified world coordinate system as an intermediary reference coordinate system. By way of example, the DVS herein can be considered as a substitute of one camera of the stereo camera.

Figure 1A:
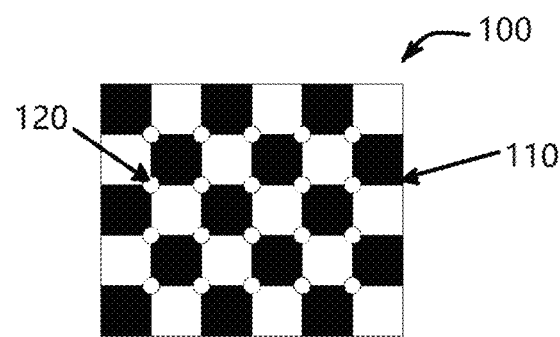
FIG. 1A illustrates an example calibration board used in the method of realizing the unified calibration between the DVS and the camera according to one or more embodiments.

FIG. 1A illustrates an example calibration board used in the method of realizing the unified calibration between the bound DVS and camera.

In this solution, the new calibration board 100 is created. The calibration board 100 consists of the normal chessboard pattern 110 and the plurality of LEDs 120 attached, such as by welding, to the corners of the normal chessboard pattern 110. In the example as shown in FIG. 1A, the calibration board 100 has the chessboard pattern 110 with 5×6 grids and twenty LEDs 120. It should be noted that other predetermined suitable number of chessboard grids and LEDs are also available.

Ideally, the conventional camera would find the corners in the chessboard pattern 110 and the DVS would find the flashing LEDs 120 at the corners. Since the LEDs are located precisely at the corners, the corners found by DVS would be matched one by one to the corners found by conventional camera.

Figure 1B:
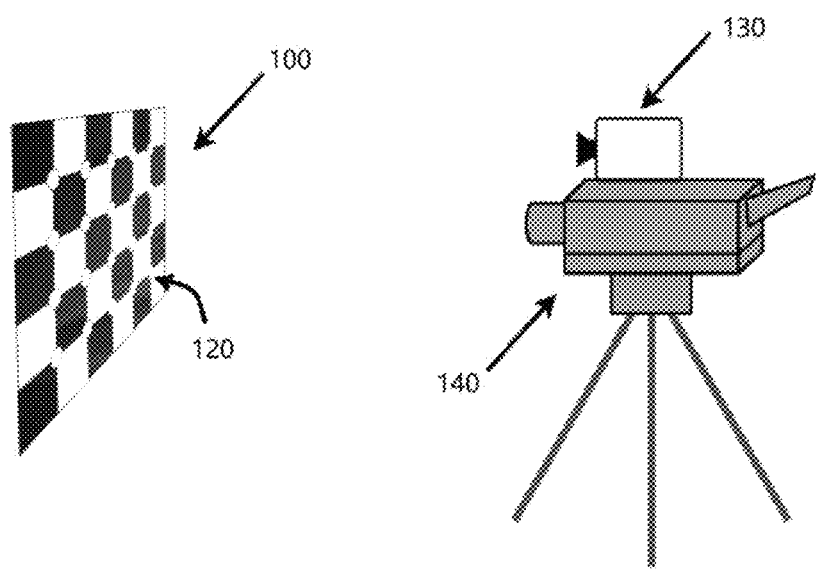
FIG. 1B illustrates an example hardware system scene for realizing the unified calibration between the DVS and the camera according to one or more embodiments.

FIG. 1B illustrates an example hardware system scene for realizing the unified calibration between the DVS and the camera.

In the unified calibration method provided in the inventive subject matter, the DVS 130 and the camera 140 are bound on for example a tripod and face to a same direction. The process of the unified calibration requires that the complete calibration board 100 appears in the fields of view of both the DVS and the camera at the same time, and thus good capture effects can be obtained. Both the DVS and the camera find the corners of the same chessboard pattern 110, so they can easily establish the one unified world coordinate system.

Therefore, in the DVS-camera unified calibration system shown in FIG. 1B, the DVS 130 and the camera 140 find the same corners at the LEDs 120 from the above-mentioned special calibration board 100, and thus makes it possible to both the DVS and the camera to apply a conventional calibration algorithm to perform the calibrations, such as a known Calibration algorithm proposed by Zhang Zhengyou called as the Zhang's Calibration algorithm, and another known Calibration algorithm named the Tsai two stage method.

By moving and changing different positions, different angles, and different attitudes of the calibration board 100 in the fields of view of the DVS 130 and the camera 140, and by changing the distances from the calibration board 100 to the bounded DVS and camera 130, 140, the DVS 130 and the camera 140 can detect the calibration board 100 multiple times to realize the unified calibration, and then calculate an extrinsic matrix between DVS and camera.

Figure 2A:
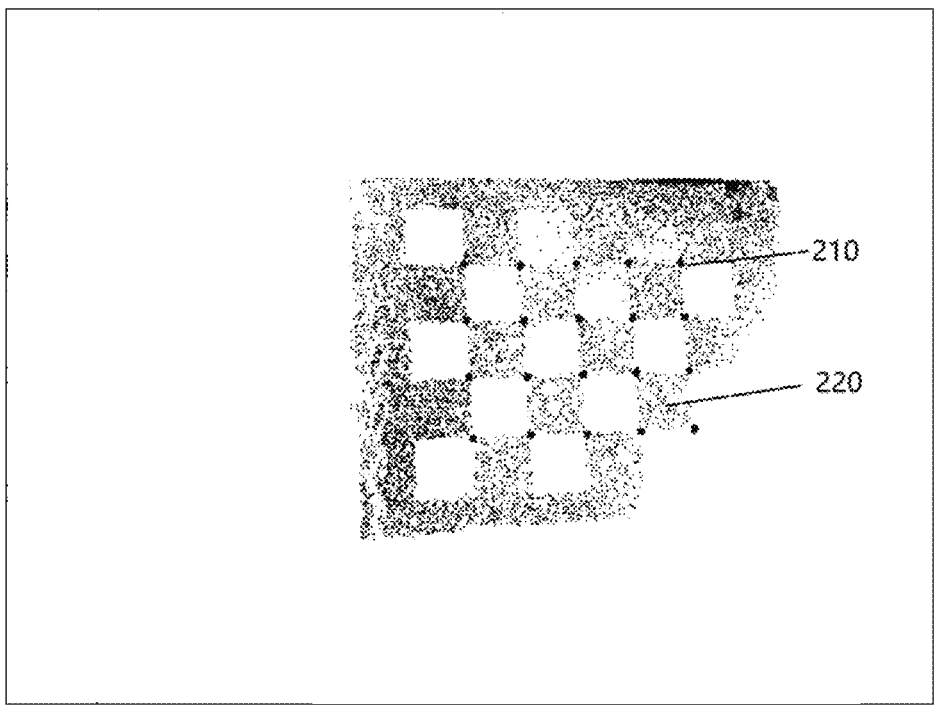
FIG. 2A illustrates an example DVS calibration board original image integrated with the LEDs not bright enough.

The camera 140 uses the calibration algorithm that find the chessboard corners by identifying the intersections of the black squares and the white squares. Comparatively, the DVS 130 uses the calibration algorithm that find the chessboard corners by detecting the intensity changes representative of the high-frequency LEDs 120. Because underlying algorithm principles of finding the calibration targets (or to say, the corners) are different between the camera and the DVS, there would be problems when calibrating. Unlike the conventional camera, the DVS does not generate images. It transmits pixel-level events. The event data is in a form of [x, y, t, p], in which x and y stand for the coordinates of the captured intensity changes in the pixel coordinate system, t stands for the time stamp of this event, and p stands for the polarity meaning this pixel-level change is becoming whether brighter or darker. The DVS captures the intensity changes and generates event data, accordingly. Then the event data generated by the DVS are transmitted into a processing unit to create asynchronous pixels to be displayed on a screen. Thus, these pixels can be originally integrated into an image and displayed on the screen. A collection of the 15 pixels created by the LED intensity changes captured by the DVS forms blobs on the image. In the example, it is conceivable that twenty blobs should be seen in the original integrated image, which are corresponding to the twenty LEDs at the corners of the checkerboard pattern. A dilemma is, if the LED is not bright enough, the algorithms applied to the DVS for finding the corners in the chessboard pattern would fail to recognize the LED blobs and get mixed up with the pixels created by the intensity changes captured due to light reflections of the chessboard. As an example, FIG. 2A shows an DVS calibration board image integrated when the LEDs are not bright enough. As can be seen in FIG. 2A, in addition to the pixels at the positions of the blobs 210 generated by the flashing LEDs, a large number of redundant pixels 220 from the chessboard pattern area that are confused around are also created.

Therefore, from human eyes to observe FIG. 2A, not only the LEDs are seen in the original DVS image of FIG. 2A, but also the chessboard pattern.

Figure 2B:
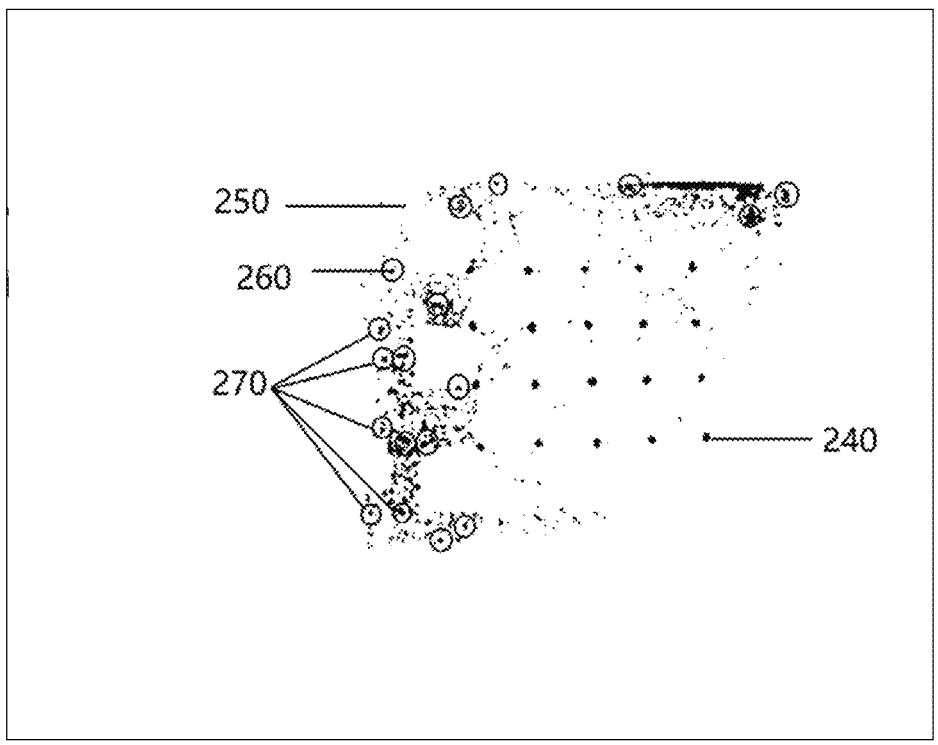
FIG. 2B illustrates the blob detection result image (noise filtered) on the DVS calibration board image in FIG. 2A.

The detection result image of the LED blob position after noise filtering is shown in FIG. 2B. Unlike the LED blobs, the pixels created from the chessboard pattern are relatively isolated on the screen, which thus can be regarded as the isolated noise pixels to be removed by running such as the outlier noise filtering. However, even after the filtering noise, many redundant pixels 250 outside the LED positions 240 are erroneously detected as the blobs 260. Such detection results are obviously inaccurate, where in FIG. 2B, some of the detected erroneous blobs 260 collected with the redundant pixels 250 are indicated by black circles 270, but it is noted that not all the erroneous blobs are indicated.

Figure 3A:
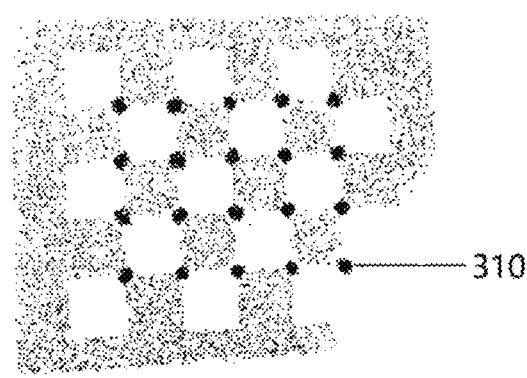
FIG. 3A illustrates an example DVS calibration board original image integrated with the too bright LEDs.
Figure 3B:
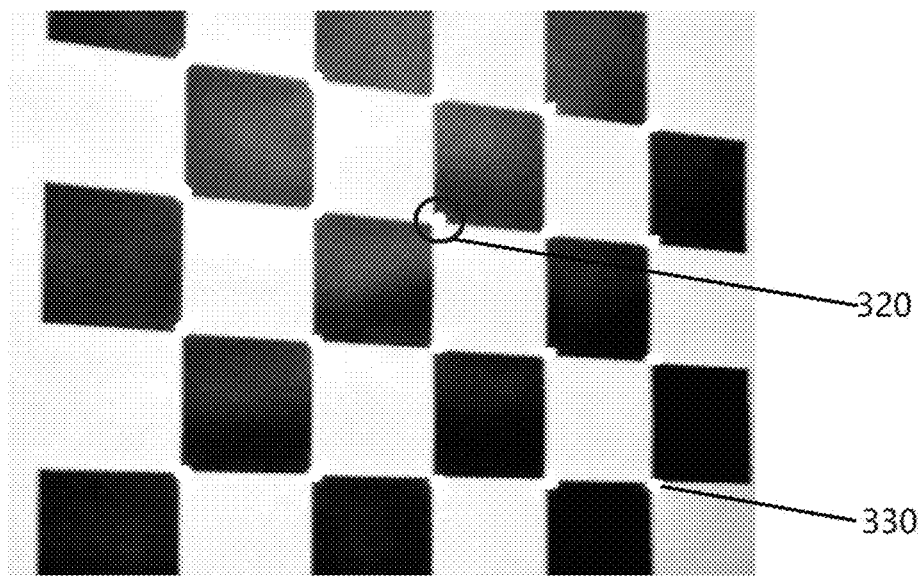
FIG. 3B illustrates an example camera calibration board image captured by the camera with the LEDs as too bright as in FIG. 3A.

On the contrary, if the LED is too bright, as shown in FIG. 3A, the blobs generated by the flashing LEDs arranged at the corners in the chessboard pattern are more obvious in the integrated image by the DVS pixels, and they can be easily recognized. However, in the calibration board image captured by the camera, the squares of the chessboard pattern are disturbed by LED light spots, one example of which are indicated as the black circle part 320 shown in FIG. 3B. Thus, the algorithms of camera may fail to find the chessboard corners, as it needs to find squares but the too bright LEDs would form big light spots blocking the intersections of the squares, and thus violate the square depiction of the chessboard pattern.

The inventive subject matter provides a new algorithm to solve this dilemma. It involves the temporal information of the DVS, or simply speaking, it uses consecutive frames, other than only one frame, for the blob detection.

Figure 4A:
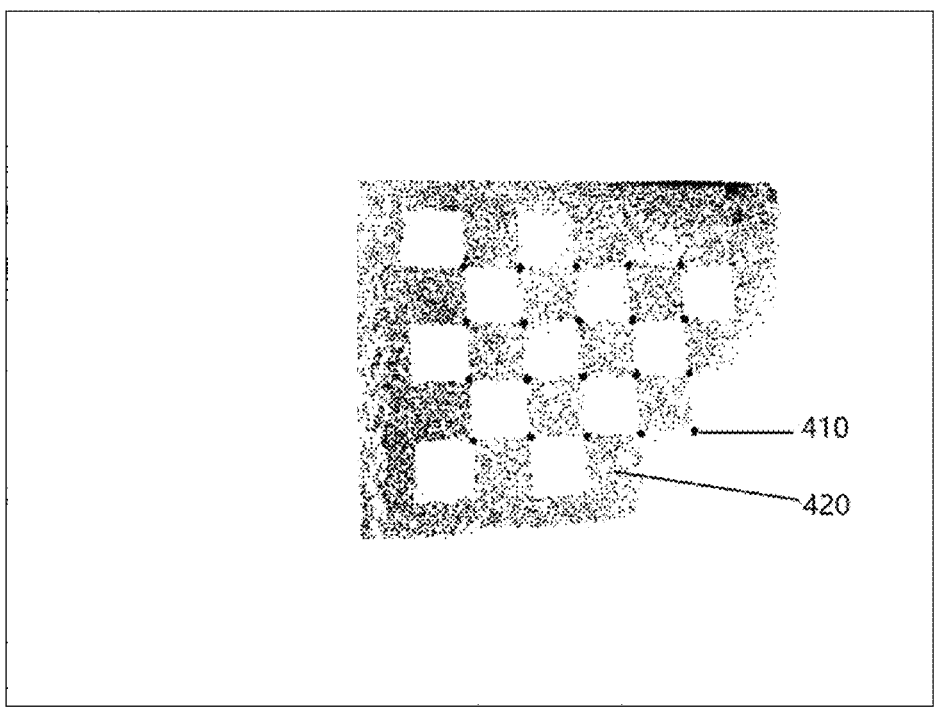
FIGS. 4A-4B illustrate exemplary two consecutive frames of the DVS calibration board original image, respectively.
Figure 4B:
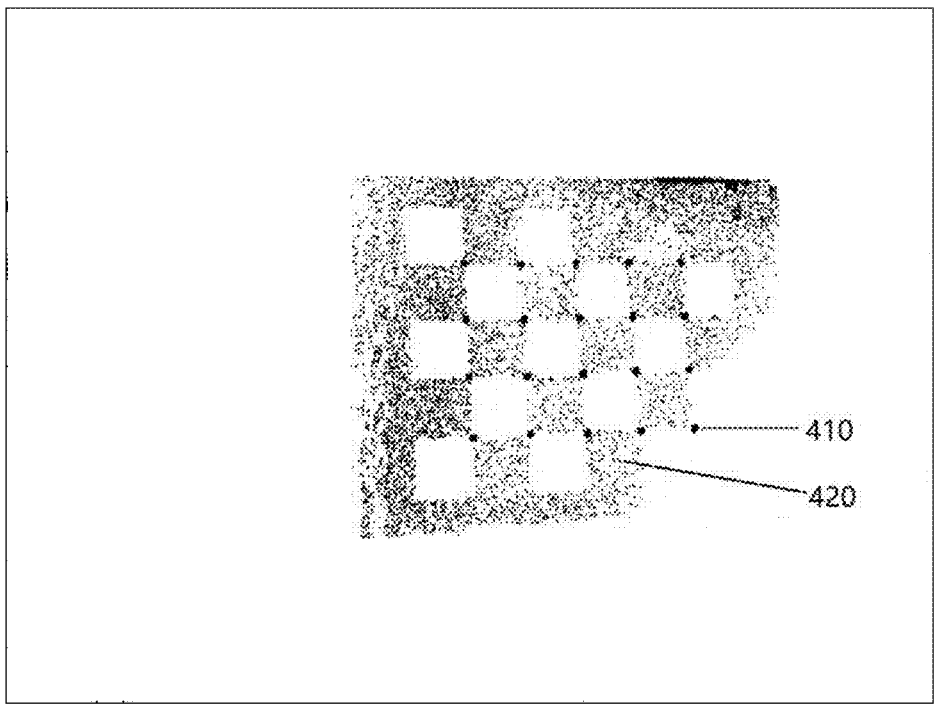

FIGS. 4A and 4B respectively show the two consecutive frames of the DVS calibration board original image, respectively. FIG. 4A is integrated with the pixels created by those data events generated by the DVS at the one time stamp, and FIG. 4B is integrated with the pixels created by those data events generated at the next time stamp. As shown in FIG. 4A and FIG. 4B, the pixels with the coordinates corresponding to the twenty LED blobs 410 are all continuous, i.e., they appear in the both two consecutive frames. However, by observing with the naked human eyes, the pixels that fall into the chessboard pattern 420 also seem to be continuous.

Figure 5A:
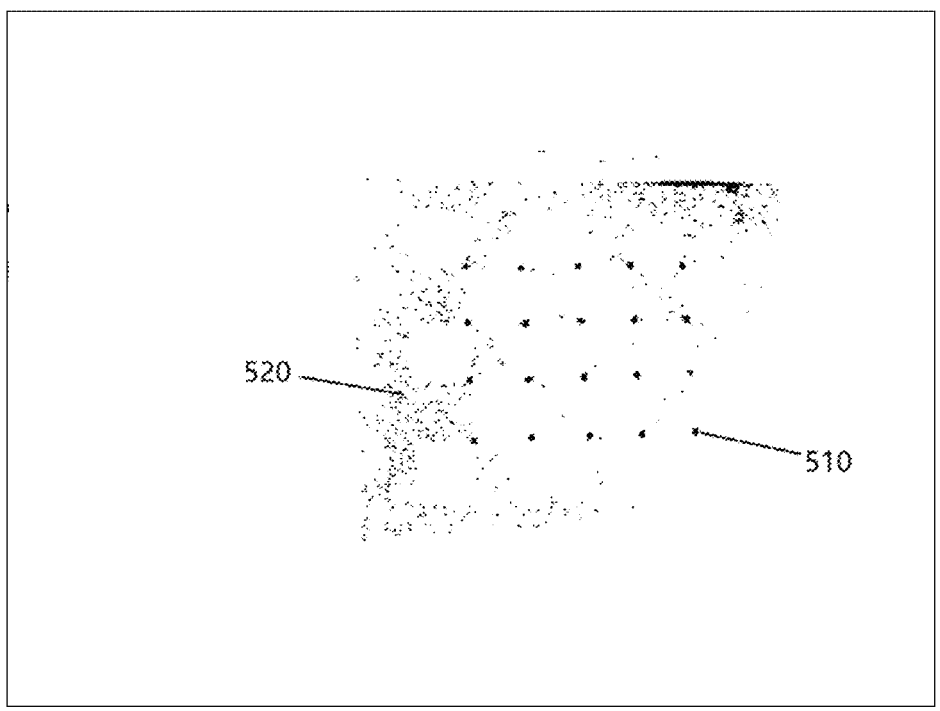
FIG. 5A illustrates the continuous-pixel image determined between the two consecutive frames of FIG. 4A-4B, respectively.
Figure 5B:
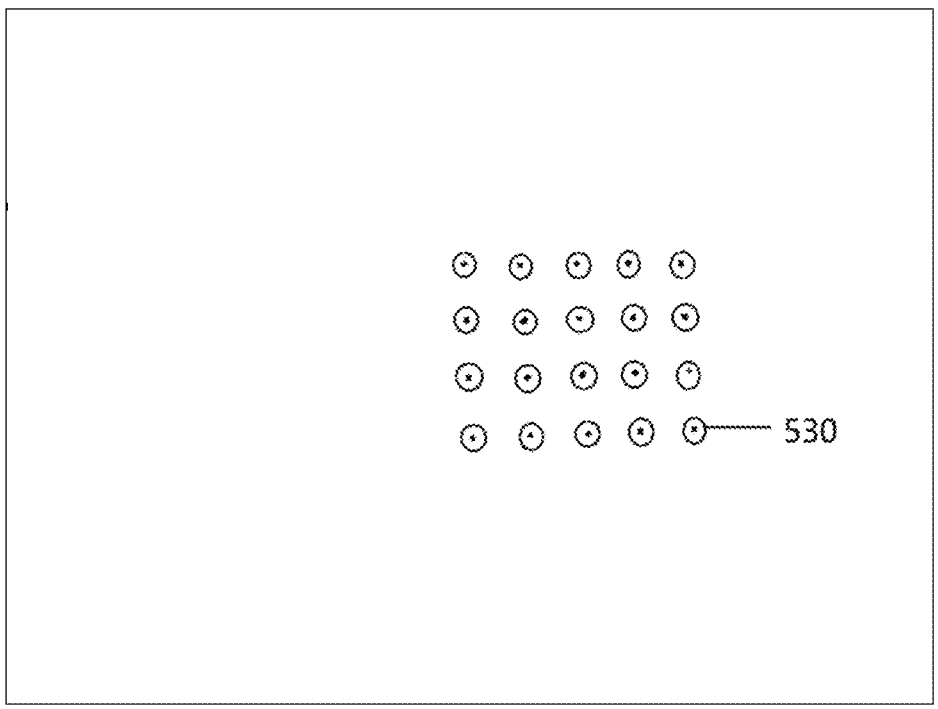
FIG. 5B illustrates the blob detection result (noise filtered) from the continuous pixels in FIG. 5A.

However, FIG. 5A shows the continuous-pixel image determined from the two consecutive frames shown respectively in FIGS. 4A and 4B. The continuous-pixel image in FIG. 5A is integrated by the continuous pixels determined from the pixels that create on both the corresponding coordinates on the two consecutive frames. Based on the human intuition, FIG. 5A should be very similar to FIG. 4A and FIG. 4B, because FIG. 4A and FIG. 4B look very similar in the first instinct of human being. However, according to analyzing the characteristics of DVS and the experimenting, it is confirmed that the pixels created from the intensity changes captured by the DVS due to the light reflections of the chessboard are not pixel-level continuous. By analyzing the DVS theory and the real-scene data, i.e., based on the process of the DVS capturing the intensity changes to generate the events and creating the pixels, it is found that, among the reflections of the chessboard, one pixel which has event data at one time stamp, would have very tiny possibility of still having event data at the next time stamp. On the contrary, the blobs 510 of the high-frequency LED lights, which functions as the corners in the chessboard pattern, would always have data in the DVS frames. This finding and the experiment results could be seen in FIG. 5A, in which however the pixels 520 other than the location of the LED are very unlikely to have data. FIG. 5B is the blob detection result (noise filtered) on FIG. 5A. It can be seen from FIG. 5B that the twenty blobs 530 detected after performing for example outlier noise filtering are exactly at the twenty LED locations, respectively. In FIG. 5B, the twenty detected blobs 530 are all circled by the black circles, respectively.

FIG. 5B shows the effect of this proposed innovation. After being processed by the provided method, the LED array is much easier to recognize, and the blob detection algorithm described above successfully finds all the LEDs as desired.

Figure 4C:
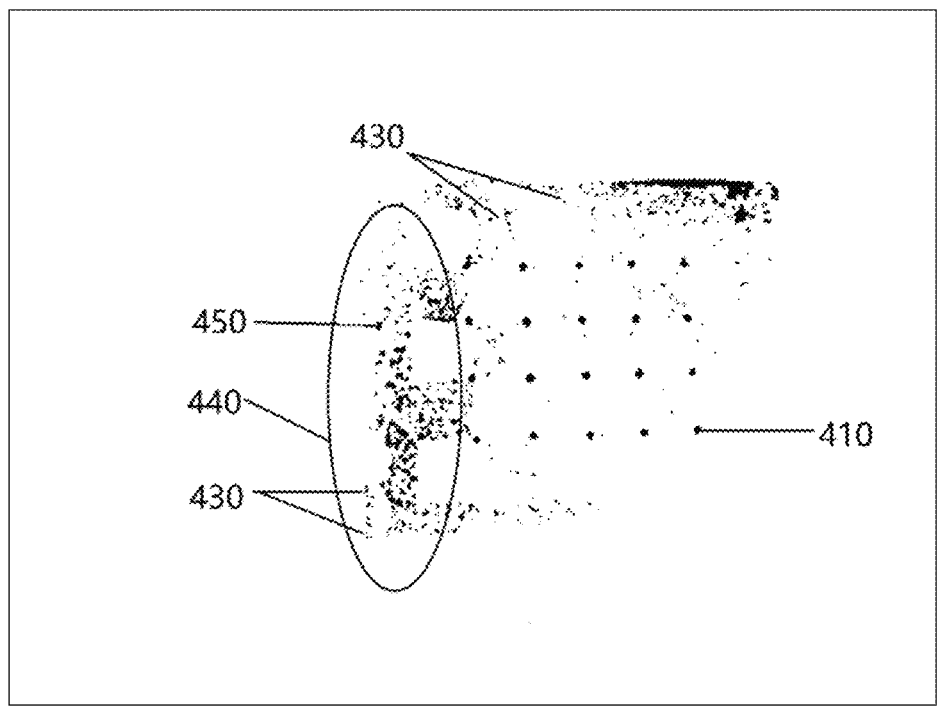
FIG. 4C illustrates the blob detection result (noise filtered) on the DVS calibration board image in FIG. 4A.

In comparison, FIG. 4C shows the blob detection result (noise filtered) on the original calibration board image in FIG. 4A. In addition to detecting the twenty LED blobs 410, there are a large number of redundant pixels 430 as interference, which renders the LED array much more difficult to recognize, and the blob detection algorithm would give false positive and false negative detection results. In FIG. 4C, the black circle 440 indicates a part of the large number of redundant pixels 430 outside the twenty LED blobs 410, and an erroneous blob 450 collected by the redundant pixels 430 is indicated as an example among many erroneous blobs.

In summary, with the above findings, it is possible to use the differences of consecutive DVS frames to extract the blobs which represent the corners of the chessboard: only the pixels which have data in all the consecutive frames are preserved. And the continuous pixels determined by this method would have greater possibility of detecting the correct blobs and finding the corners in the chessboard pattern.

Figure 6:
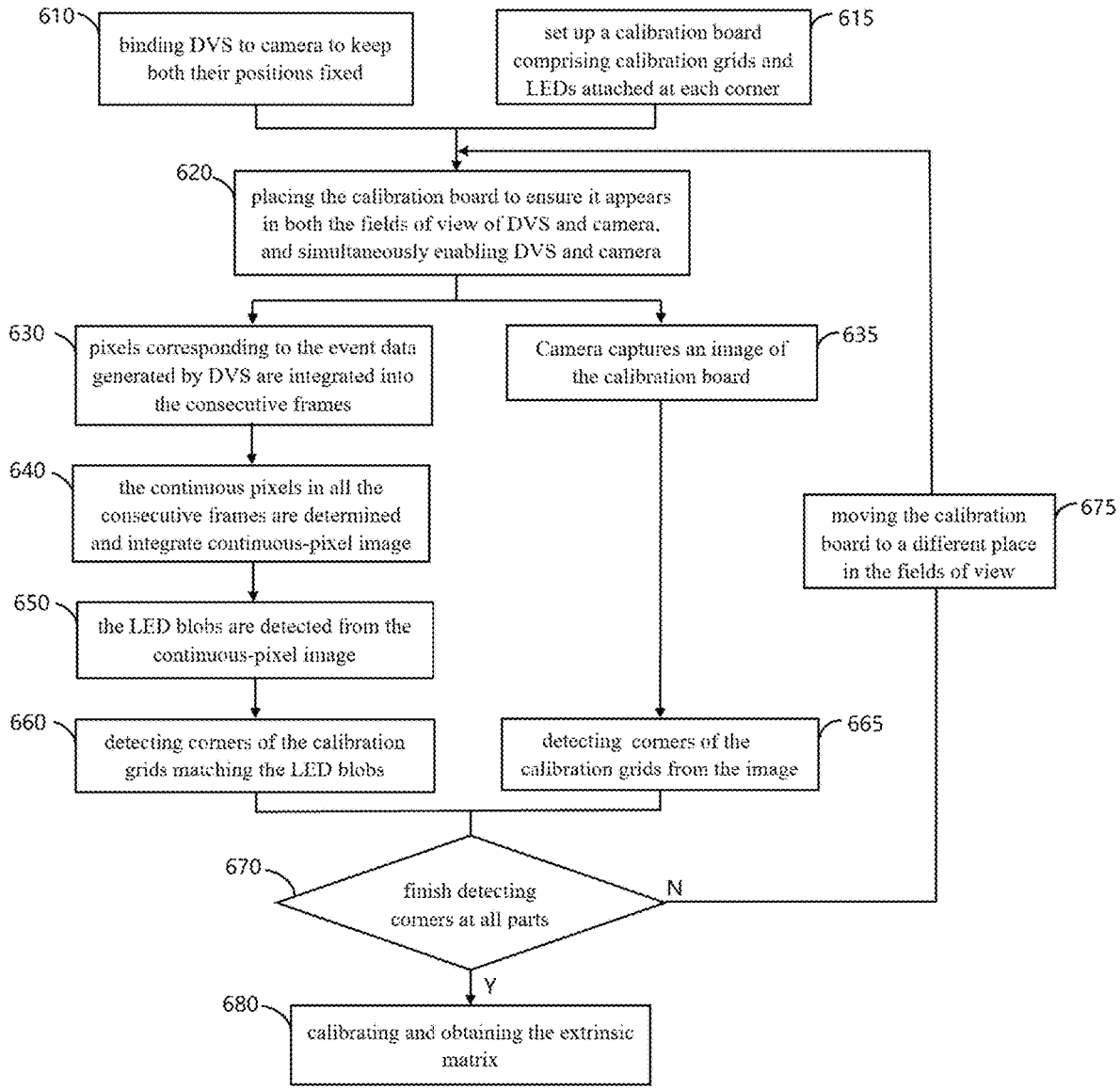
FIG. 6 illustrates an example flowchart illustrating the method of unified calibration between DVS and camera according to one or more embodiments.

FIG. 6 illustrates an example flowchart illustrating the method of realizing the unified calibration between the DVS and the camera according to the inventive subject matter. The method comprises the following steps:

In step 610, the DVS is bound to the camera to keep both their locations fixed. For example, the DVS and the camera can be integrally fixed on a tripod as a bound DVS-camera apparatus. The DVS and the camera should keep facing to a same direction and should not be moved during the whole calibration process.

In step 615, the special calibration board is set up. The calibration board is made to comprise the calibration grids and the plurality of high-frequency LEDs. The calibration grids are arranged on a surface of the calibration board. Each grid of the calibration grids is a square. By way of example, the calibration grids are composed of the black squares and the white squares at intervals. In another example, the calibration grids can be in form of a chessboard pattern.

The high-frequency LEDs are attached, as by welding exactly to the corners of the calibration grids, respectively. Each LED has at least two different intensities detectable by the DVS. The LEDs flash between these intensities, for example, at the same high frequency, which should allow the intensity changes to be captured by the DVS. The at least two different intensities of the flashing LEDs should be set to generate the light spots not disturbing the square depiction of each calibration grids in the calibration board image captured by the camera.

In step 620, the special calibration board made in the step 615 is placed on the front side of the DVS and the camera, by adjusting the distance between the calibration board and the bound DVS-camera apparatus to ensure that the calibration board completely appears in both the fields of view of the DVS and the camera. Let the surface with the calibration grids face to the DVS and the camera, and then simultaneously enable the DVS to capture the intensity changes of the flashing LEDs on the calibration board and the camera to capture the image of the calibration board.

On one hand, in step 630, after enabling the DVS, it captures the intensity changes on the calibration board to generate the event data. The pixels corresponding to the coordinates included in these event data are respectively created and displayed on a screen according to the consecutive time stamps, to integrate the consecutive frames.

In step 640, the continuous pixels which appear in all the consecutive frames are determined. These continuous pixels are displayed on the screen to integrate the continuous-pixel image.

In step 650, the LED blobs are detected from the continuous-pixel image. After performing the noising filtering processing on these continuous pixels, the locations of the blobs generated by the flashing LEDs are detected, which are, the corner locations of the calibration grids, respectively. Thus, the corners of the calibration grids on the calibration board is detected, in step 660.

On the other hand, after enabling the camera, it captures the image of the calibration board in step 635. Normally, in the same period when the camera captures the image, for example, during the exposure time of the camera, it can meet the time requirement of the capture of the intensity changes on the consecutive time stamps required by the DVS in step 630. The camera detects the corner locations from its captured image of the calibration grids in step 665.

Next, in steps 670 and 675, the calibration board can be moved to another area inside the common fields of view of the DVS and the camera. For example, the calibration board can be fixed at three of near, middle, and far distances from the bound DVS-Camera apparatus, and placed at different positions in at least the central, the upper left, upper right, lower left, and lower right of their fields of view. The DVS and the camera both detecting the corners of the calibration grids on the calibration board can be repeated with these positions by moving the calibration board in their fields of view, respectively, in order to calibrate all the areas within their lens.

Finally in step 680, since the unified world coordinate system has been established between the DVS and the Camera by detecting the same one of calibration board, the extrinsic matrix between the DVS and the camera can be calculated through performing the coordinate transformations using the unified world coordinate system as the reference coordinate system to converse it to the coordinate systems of the DVS and the camera, and therebetween, respectively.

In an example, the above-described steps 630-665 and 680 can be completed by a processing unit, for example but not limited to, Computer Processing Unit (CPU), Digital Signal Processor (DSP), Field Programmable Gate Array (FPGA), or Micro Processor Unit (MPU), and so on.

In another example, it is conceivable that the calibration board may be moved to another area in the common fields of view of the DVS and the camera to repeat the capture, respectively, before the processing unit processes the detection of the corners of the calibration grid on the calibration board.

Compared to conventional camera, the DVS has advantages on: low-latency, no motion blur, high dynamic range, and low power consumption. Since the DVS captures and transmits the event data immediately upon illumination changes occurring, the latency for DVS is in microsecond while the latency for conventional camera is in millisecond. In multi-camera systems, replacing one or more camera with DVS can further bring benefits due to the above advantages, such as higher efficiency, cost savings, etc.

Consequently, the DVS does not suffer from motion blur. And as a result, the data rate of DVS is usually 40-180 kB/s (for a conventional camera, it would usually be 10 mB/s), meaning less bandwidth is needed and less power is consumed. Furthermore, the dynamic range of the DVS is about 120 dB while the dynamic range of the conventional camera is about 60 dB. A wider dynamic range is useful under extreme light conditions. For example, when a vehicle is entering and exiting a tunnel, when other vehicles travelling in an opposite direction turn on the high beam, sunshine direction changes, and so on. When the DVS is used in conjunction with Camera, the response is quicker and more versatile.

The inventive subject matter provides a method for unified calibration of the DVS and the camera. After calibration, any applications that are conducted using a camera would also be possible using a DVS. For example, multiple view geometry, wherein both the projection matrices from each of the DVS and the camera can be combined to obtain the inverse projection matrix, used to estimate the point spatial situation with the information received from all the vision sensors. For example, 3D reconstruction is achieved by using the extrinsic projection matrix in reverse given the 2D points from two vision sensors. It is conceivable that such applications can play a major role in reshaping 3D scenes in such as the traffic monitoring systems and medical imaging sciences.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects.

While exemplary embodiments are described above, it is not intended that these embodiments describe all possible forms of the inventive subject matter. Rather, the words used in the specification are words of description rather than limitation, and it is understood that various changes may be made without departing from the spirit and scope of the inventive subject matter. Additionally, the features of various implementing embodiments may be combined to form further embodiments of the invention.

The invention claimed is:

1. A method of realizing unified calibration between at least one dynamic vision sensor
   (DVS) and at least one camera, the method comprising the steps of:
   binding the at least one DVS to the at least one camera; setting up a calibration board comprising calibration grids and a plurality of high-frequency LEDs, wherein the calibration grids are arranged on a surface of the calibration board, and the plurality of high-frequency LEDs are each attached to corners of the calibration grids;
   arranging the calibration board inside fields of view of both the at least one DVS and the at least one camera, and the surface of the calibration board with the calibration grids facing to the at least one DVS and the at least one camera; and enabling the at least one DVS and the at least one camera to detect corners of the calibration grids on the calibration board, respectively;
   wherein the method further comprises the steps of:
   capturing intensity changes to generate event data by the at least one DVS;
   integrating pixels created from the event data into multiple consecutive frames
   of an original calibration board image to determine continuous pixels, and then detecting the locations of the plurality of high-frequency LEDs, and
   calculating an extrinsic matrix between the at least one DVS and the at least one camera.

2. The method of claim 1, wherein blobs detected from continuous-pixel image integrated by the continuous pixels are corresponding to the locations of the plurality of high-frequency LEDs.

3. The method of claim 1, wherein the continuous pixels are those pixels continuously appear among the multiple consecutive frames of the calibration board image.

4. The method of claim 1, wherein the multiple consecutive frames are at least two
   consecutive frames.

5. The method of claim 1, wherein the plurality of high-frequency LEDs each has at least two different intensities detectable by the at least one DVS.

6. The method of claim 5, wherein each grid of the calibration grids is a square, and light spots generated with the at least two different intensities do not disturb depictions of the square in calibration board image captured by the at least one camera.

7. The method of claim 1, wherein the calibration grids are composed of black squares and white squares at intervals.

8. The method of claim 1, wherein the locations of the plurality of high-frequency LEDs detected are matched one by one to the corners on the calibration grids detected in the calibration board image captured by the at least one camera.

9. The method of claim 1, further comprising the step of moving the calibration board to
   different areas within the fields of view of both the at least one DVS and the at least one camera in different positions, different angles, and different attitudes, respectively.

10. The method of claim 1, wherein the extrinsic matrix between the at least one DVS and
    the at least one camera is calculated by performing coordinate system transformations.

11. A system of realizing unified calibration between dynamic vision sensor (DVS) and camera, comprising: at least one camera; at least one DVS bound to the at least one camera; a calibration board comprising calibration grids and a plurality of high-frequency LEDs, wherein the calibration grids are arranged on a surface of the calibration board, and the plurality of high-frequency LEDs are each attached to corners of the calibration grids; wherein the calibration board is arranged inside the fields of view of both the at least one DVS and the at least one camera, and the surface with the calibration grids is facing to the at least one DVS and the at least one camera; wherein the at least one DVS and the at least one camera are enabled to detect the corners of the calibration grids on the calibration board, respectively; and wherein the at least one DVS captures intensity changes to generate event data, and wherein the system further comprises: a processing unit coupled to the at least one DVS and the at least one camera, configured to integrate pixels created from the event data into multiple consecutive frames of an original calibration board image, determine continuous pixels from the multiple consecutive frames, detect the locations of the plurality of high-frequency LEDs, and calculate extrinsic matrix between the at least one DVS and the at least one camera.

12. The system of claim 11, wherein blobs detected from continuous-pixel image integrated by the continuous pixels are corresponding to the locations of the plurality of high-frequency LEDs.

13. The system of claim 11, wherein the continuous pixels are those pixels continuously appear among the multiple consecutive frames of the DVS calibration board image.

14. The system of claim 11, wherein the multiple consecutive frames are at least two consecutive frames.

15. The system of claim 11, wherein the plurality of high-frequency LEDs each has at least two different intensities detectable by the at least one DVS.

16. The system of claim 15, wherein each grid of the calibration grids is a square, and light spots generated with the at least two different intensities do not disturb depictions of the square in calibration board images captured by the at least one camera.

17. The system of claim 11, wherein the calibration grids are composed of black squares and white squares at intervals.

18. The system of claim 11, wherein the locations of the plurality of high-frequency LEDs detected are matched one by one to the corners on the calibration grids detected in the camera calibration board image captured by the at least one camera.

19. The system of claim 11, wherein the calibration board is further moved to different areas within the fields of view of both the at least one DVS and the at least one camera in different positions, different angles, and different attitudes, respectively.

20. The system of claim 11, wherein the extrinsic matrix between the at least one DVS and the at least one camera is calculated by performing coordinate system transformations.

* * * * *